UNITED STATES PATENT OFFICE.

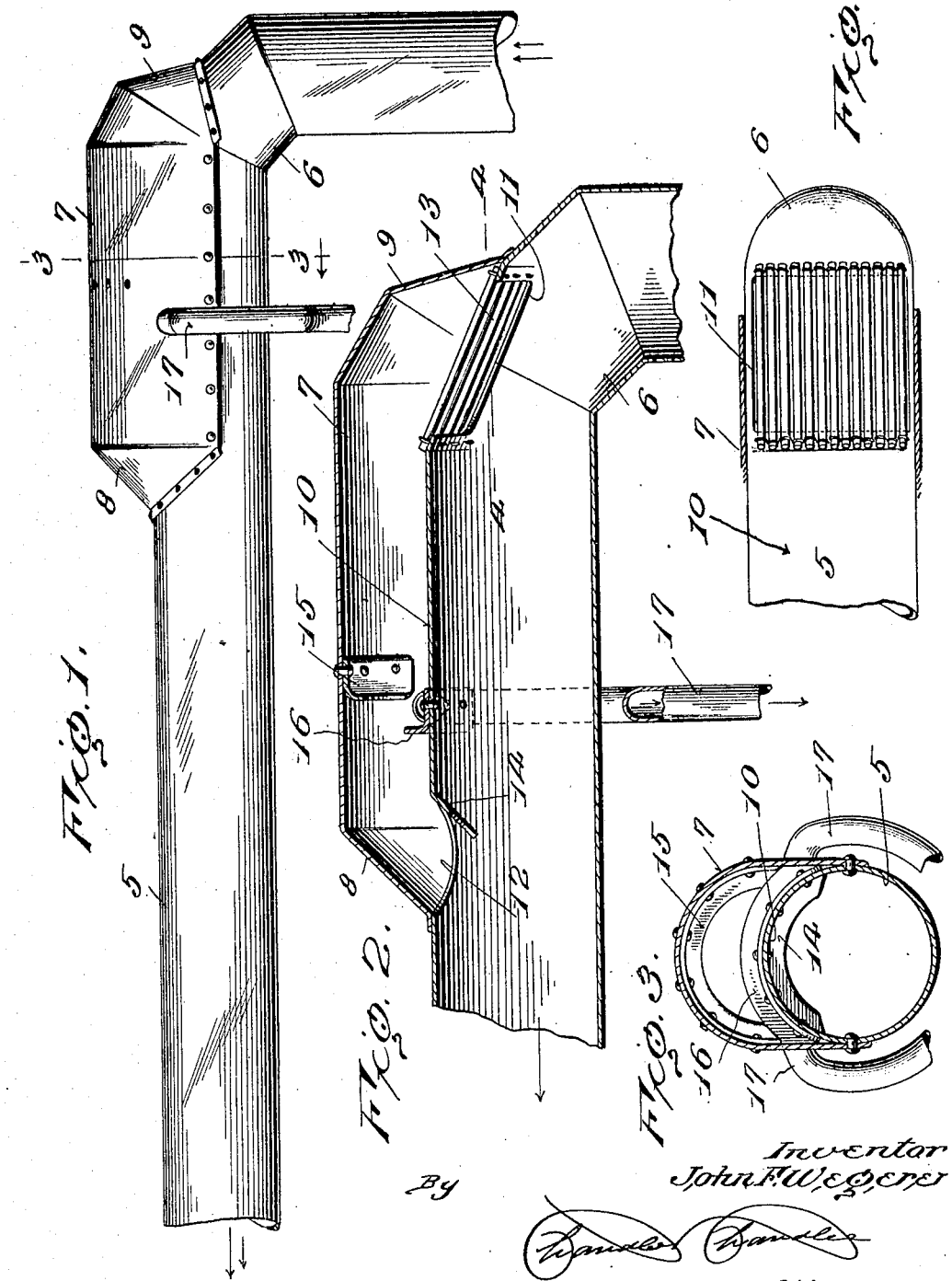

JOHN F. WEGERER, OF MARION, KANSAS.

BLOWPIPE ATTACHMENT FOR GRAIN-SEPARATORS.

1,308,825.   Specification of Letters Patent.   Patented July 8, 1919.

Application filed January 25, 1919. Serial No. 273,086.

*To all whom it may concern:*

Be it known that I, JOHN F. WEGERER, a citizen of United States, residing at Marion, in the county of Marion, State of Kansas, have invented certain new and useful Improvements in Blowerpipe Attachments for Grain-Separators; and I do hereby declare the following to be a full, clear and exact description of the invention, such as will enable others skilled in the art to which it appertains to make and use the same.

This invention has reference to the class of threshing or separating machines, and more particularly to an improvement in blower pipes therefor.

It is comprehended by the invention to provide an improved blower pipe for threshers or other grain separating machines, or an attachment therefor particularly designed for use in the threshing of wheat, so that the grain is carried along with the chaff and straw, into the blower pipe, will be effectively separated therefrom and automatically discharged to be caught in a suitable receptacle, while the chaff and straw will be blown from the pipe in the usual manner, on to the stack. By this means, a considerable saving in grain production is accomplished, as ordinarily, a large quantity of grain which is not threshed out, is carried along with the chaff and straw, irrespective of how closely the cylinder and concave teeth may be positioned, and it will therefore be obvious that in view of the large number of machines in use, an enormous saving will thereby be effected, thereby materially increasing the grain or wheat production.

A still further object of the invention is to provide an improved attachment for an Avery or other improved type of blower, in which there is disposed at the elbow of the blower or point of bend thereof remote from the discharge and through which the grain, straw and chaff is discharged, a novel arrangement of parts whereby the grain carried along with the straw and chaff, will be caused to be deflected into an enlargement of the blower pipe while permitting the straw and chaff to be carried in the usual manner for discharge from the blower pipe, such attachment embodying a novel form of screen device permitting the passage of a maximum quantity of the grain and but a minimum quantity of the straw and chaff, into said enlargement, after which, through the medium of a novel arrangement of baffle walls, the grain is caught and discharged from either side of the blower pipe, in a condition free from foreign matter, chaff, straw or dirt, thereby greatly increasing the power of the machine to produce usable grain. While I have particularly specified the use of the device in connection with the threshing of wheat, I desire to have it understood that the improvement can be employed with various grains, as occasion shall arise.

With the above objects and others in view, as will appear as the specification proceeds, the invention comprises certain novel combinations and arrangements of parts as will be hereinafter more particularly pointed out in the accompanying description and claims.

Reference is had to the accompanying drawings forming a part of this application wherein like reference characters designate similar parts throughout the several views, and wherein;

Figure 1, is a side elevation of a portion of a blower pipe of a threshing machine, showing my improved attachment applied thereto, or showing a blower pipe construction in accordance with the invention.

Fig. 2, is a vertical longitudinal sectional view thereof.

Fig. 3, is a transverse sectional view taken vertically of the device, on the line 3—3 of Fig. 1 and looking in the direction indicated by the arrows, and Fig. 4, is a fragmentary horizontal sectional view, taken on the line 4—4 of Fig. 2.

Referring to the drawings in detail, there is shown, a fragmentary portion 5 of a blower pipe of angular form, as commonly employed in connection with threshing or separating machines, and more especially what is known in the trade as the Avery blower. This pipe has the usual elbow 6 or point of bend, where it extends from the threshing machine proper, to a point horizontally for discharging the chaff and straw, from which the grain has been separated, to produce a stack or as it may be stated, blowing the straw and chaff, to "stack" the same.

Moreover, it is impossible to separate all of the grain from the straw and chaff, that is, not all of the heads, no matter how closely the cylinder and concave teeth may be positioned or engaged, with respect to each other, or how much speed is imparted to the cylinder in the threshing or separating action and therefore, with the ordinary blower, there is a considerable quantity of grain carried along with the chaff and straw, and which is therefore wasted.

In order to obviate this waste, I provide the improved blower or attachment for the ordinary pipe which consists in providing upon the pipe 5, a convex enlargement or raised portion 7 having end portions 8 and 9 respectively, fitting the contour of the pipe 6 from a point adjacent to the bend of the elbow horizontally, along the top portion of the blower pipe and preferably comprising a plate bent in form and riveted or otherwise secured to or forming a part of the pipe, with means for obtaining access thereto, if desired.

The medial top portion of the pipe 5 beneath the raised portion or enlargement 7, is left unmolested, thereby providing an intermediate horizontal wall or partition designated by the numeral 10, while the partition is shown as being produced by forming in the top of the pipe, adjacent to the elbow, an opening 11, and at a point in the top of the pipe remote from the elbow and the opening 11, an opening 12. Said partition may be otherwise suitably formed. It will thus be seen that the enlargement through the medium of the inclined end walls 8 and 9, will provide for the efficient deflection and discharge of air through the pipe as will be later described and in a manner to obviate the possible obstruction of the blower pipe in the operation of separating the straw and chaff from the grain and stacking the same, as it is thought will be understood by any one acquainted with the art.

Within the housing of the raised portion or enlargement 7 and extending longitudinally of the opening 11, is a wire screen 13, comprising a series of independent wires placed in parallel relation as closely as possible, consistent with the proper passage of the grain or heads of the grain therethrough, after being discharged or blown from the threshing mechanism, while also consistent with the passage of a minimum quantity, if not excluding all of the straw and chaff or other foreign matter, from passing therethrough into the upper chamber of the housing above the blower pipe proper.

In this connection, it should be noted that the screen 13 is placed at a slight incline, so as to offer the least possible obstruction to the free passage of the straw and chaff, while freely permitting the passage of the grain therethrough, under the suction action created in the blower pipe. This screen also entirely spans the opening 11, and above the adjacent end of the partition 10 provided by the intermediate portion of the upper part of the pipe produced by the openings 11 and 12 heretofore described, while in order to hold the suction in the upper part of the housing, and to insure proper suction in the lower part for properly carrying or conveying the straw and chaff through the blower pipe and discharging the same, the opposite or remote end of said partition is bent downwardly as shown at 14 in the form of a deflector. This is due to the fact that the outlet below the partition 10 is restricted, thereby creating a suction in front of the lower chamber of the enlargement or pipe at this point.

Arranged against the top portion of the wall of the enlargement or housing 7, is a substantially angular baffle wall or plate 15, of concavo-convex cross section and of curved contour so as to fit the inner surface of the top portion of the housing. Positioned at a spaced distance below and in advance of the baffle wall or deflector 15, and upon the partition or top portion 10 of the pipe proper, is an oppositely disposed baffle plate or deflector 16 also preferably of concavo-convex cross section in its preferred construction and spaced from the deflector 15, as previously stated. This deflector 16 is made in the form of a trough, so that it will retain the grain thereon, in a manner to be hereinafter more particularly described, in connection with the operation of the device, and has at its opposite ends, leading through diametrically opposite points of the sides of the blower pipe and downwardly along the same, discharge pipes 17 through which the grain is discharged and may be caught in a suitable receptacle or bucket provided under it.

In the operation of the device, it is to be understood that the shocks of grain are to be fed into the thresher or separating machine in the usual manner and will be acted upon by the cylinder mechanism to knock or separate the heads of the grains from the straw and chaff or other foreign matter. Ordinarily, the grains are delivered separately from the straw and chaff, but owing to the large quantity of grain being carried along with the straw and chaff to be stacked, in passing through the blower, the grain is caused to strike the inclined screen 13 and will pass into the upper chamber. These grains will then strike the deflector 15 and be caused to be discharged or deflected downwardly on to the baffle walls 16 or trough produced thereby, the grain being discharged through the pipes, as the operation is carried on. In this connection, it is to be understood that a certain amount of air passes through the screen and upper chamber through the openings 11 and 12, and out through the blower pipe to create suction in connection with the air passing through the lower chamber or pipe proper and under the deflector or baffle wall part 14, the major portion if not all of the straw, chaff and foreign matter being blown or discharged through the pipe without entering the upper chamber to choke or clog up the same. In this manner, a considerable quantity of grain which would otherwise be thrown on to the stack and wasted, is saved the importance of which is very obvious. It is also to be understood that the housing 7 may be secured in any suitable manner to the blower pipe, so as to be removable together with the wire screen 13, so that the openings 11 and 12 can be closed when threshing Kafir corn or fodder, or the like.

Having thus described my invention, what I claim and desire to secure by Letters Patent of the United States, is—

1. An improved blower pipe for grain separating or harvesting machines, comprising a pipe proper having a raised housing portion, said pipe having a wall portion forming an intermediate partition, said partition having openings adjacent either end of the housing and providing upper and lower chambers, a screen in the opening at the end remote from the discharge end of the blower pipe, and baffle plates in the upper chamber having a discharge spout.

2. An improved blower pipe for grain separating or harvesting machines, comprising a pipe proper having spaced openings therein, a raised housing on the pipe, the pipe between said opening forming an intermediate partition, providing upper and lower chambers, a screen at the end remote from the discharge end of the blower pipe, said partition having its remote end bent downwardly a baffle wall in the upper portion of the top chamber, a baffle wall secured to said partition at a point in advance of the first named baffle wall and spaced therefrom and a discharge spout leading from the second named baffle wall for the discharge of the grain caught thereby.

3. The combination with a blower pipe of the class described having an elbow; of a housing positioned above the same, said pipe having spaced openings therein in its top portion, a screen comprising longitudinally disposed spaced wires adjacent to the elbow of the pipe and covering the opening thereat, to permit grain carried along with the chaff and straw at the top of the latter, to pass there through but to deflect the chaff and straw through the pipe proper for stacking, a concavo-convex baffle wall secured inside of the top wall of the housing at the end thereof remote from the screen, a trough mounted upon the portion of the top wall of the pipe between the openings upon which the grains deflected by said baffle wall are deposited, said trough sloping to the side and discharge means for said blower.

4. The combination with an angular blower pipe of the class described; of a housing positioned above the same, opposed baffle walls in the housing, said pipe having spaced openings therein in its top portion, a screen comprising longitudinally disposed spaced wires adjacent to the point of bend of the pipe, the opposed ends of the housing sloping in opposite directions to provide channels through which the air will pass with the grain for throwing the same forcedly against the baffle walls, one of said baffle walls producing a trough, said trough being of concavo-convex cross section and spaced apart with the trough forming wall located in advance of the other and the end of the top portion at the remote opening being bent downwardly, as and for the purposes specified.

In testimony whereof, I affix my signature, in the presence of two witnesses.

JOHN F. WEGERER.

Witnesses:
Jas. Newlin,
F. F. Wegerer.

Copies of this patent may be obtained for five cents each, by addressing the "Commissioner of Patents, Washington, D. C."